United States Patent
Hung et al.

(10) Patent No.: US 9,568,962 B2
(45) Date of Patent: Feb. 14, 2017

(54) EXPANSION CARD SECURING MECHANISM

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Wen-Hsiang Hung, New Taipei (TW); Jun-Bo Yang, Wuhan (CN); Chun-Bao Gu, Wuhan (CN); Hong-Mei Zhang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

(*) Notice: Subject to any disclaimer, the term of this patent is extended or adjusted under 35 U.S.C. 154(b) by 42 days.

(21) Appl. No.: 14/700,664

(22) Filed: Apr. 30, 2015

(65) Prior Publication Data

US 2016/0187939 A1 Jun. 30, 2016

(30) Foreign Application Priority Data

Dec. 31, 2014 (CN) .......................... 2014 1 0847176

(51) Int. Cl.
*H05K 1/14* (2006.01)
*G06F 1/18* (2006.01)

(52) U.S. Cl.
CPC ............... *G06F 1/186* (2013.01); *G06F 1/185* (2013.01)

(58) Field of Classification Search
CPC .......... G06F 1/183; G06F 1/185; G06F 1/186; G06F 1/1632; H05K 7/1402; H05K 7/1405; H05K 7/1487; H05K 7/1418; H05K 1/1424
USPC ................ 361/679.02, 679.4, 679.6, 679.32, 361/679.58, 752, 754, 759, 798, 801, 802; 70/58; 439/61, 296, 325, 327, 345
See application file for complete search history.

(56) References Cited

U.S. PATENT DOCUMENTS

| | | | |
|---|---|---|---|
| 6,173,843 B1* | 1/2001 | Christensen | G06F 1/184 211/41.17 |
| 6,353,541 B1* | 3/2002 | Leman | G06F 1/183 211/41.17 |
| 6,775,147 B2* | 8/2004 | Kim | G06F 1/184 211/41.17 |
| 6,934,161 B2* | 8/2005 | Kim | G06F 1/184 361/695 |
| 6,970,363 B2* | 11/2005 | Bassett | G06F 1/184 211/41.17 |

* cited by examiner

*Primary Examiner* — Hung S Bui
(74) *Attorney, Agent, or Firm* — Zhigang Ma

(57) ABSTRACT

An expansion card securing mechanism is configured to secure different kinds of expansion cards. The expansion card securing mechanism includes a base and a plurality of securing members which are secured on the base. The base includes a latch portion. The latch portion defines a plurality of latch holes, the securing member can be secured in the latch hole. Each securing member defines a cavity, the latch hole and the cavity can receive different kinds of expansion cards to secure the expansion cards.

18 Claims, 5 Drawing Sheets

EXPANSION CARD SECURING MECHANISM

CROSS-REFERENCE TO RELATED APPLICATIONS

This application claims priority to Chinese Patent Application No. 201410847176.0 filed on Dec. 31, 2014, the contents of which are incorporated by reference herein.

FIELD

The subject matter herein generally relates to securing mechanisms, and more particularly to an expansion card securing mechanism.

BACKGROUND

A plurality of expansion cards are installed in the computer. However, the expansion card may become loose under normal operation.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
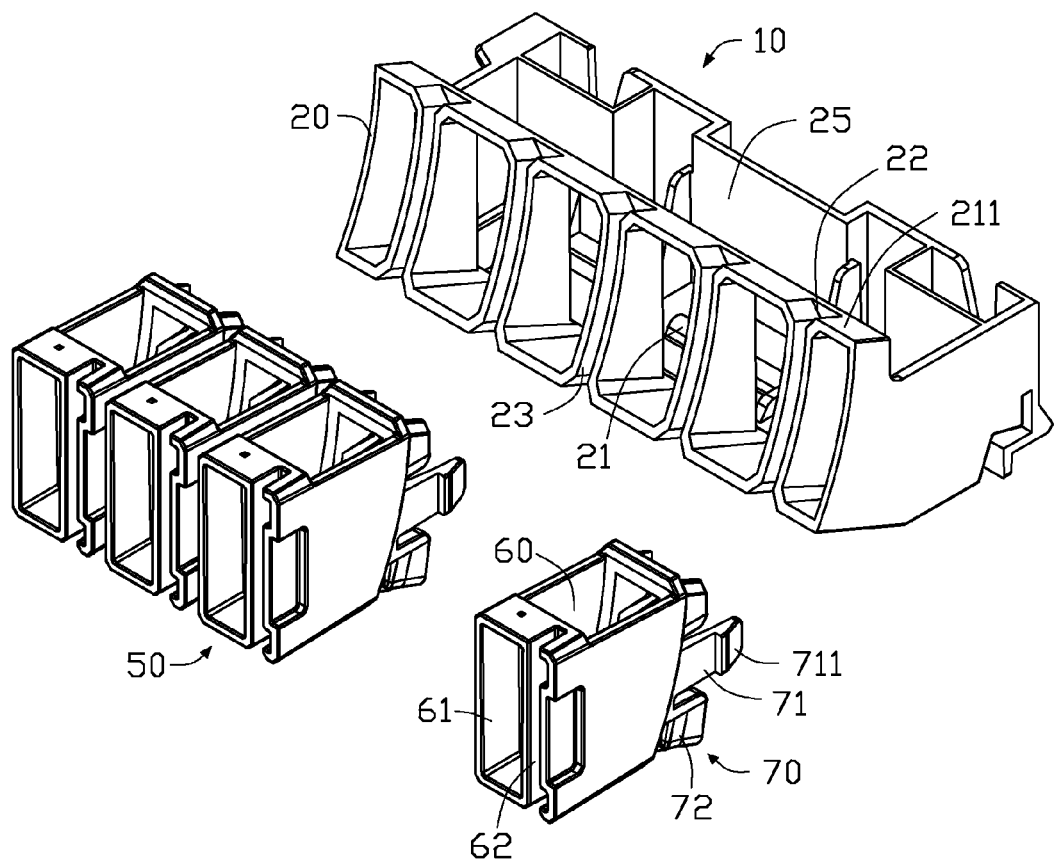
FIG. 1 is an isometric, exploded view of an embodiment of an expansion card securing mechanism.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates one embodiment of an expansion card securing mechanism 100. The expansion card securing mechanism 100 is configured to secure a plurality of different kinds of expansion cards 80 (shown in FIG. 5). The expansion card securing mechanism 100 and the expansion cards 80 are secured in a chassis 90. The expansion card securing mechanism 100 includes a base 10 and a plurality of securing members 50 configured to be secured on the base 10.

Figure 2:
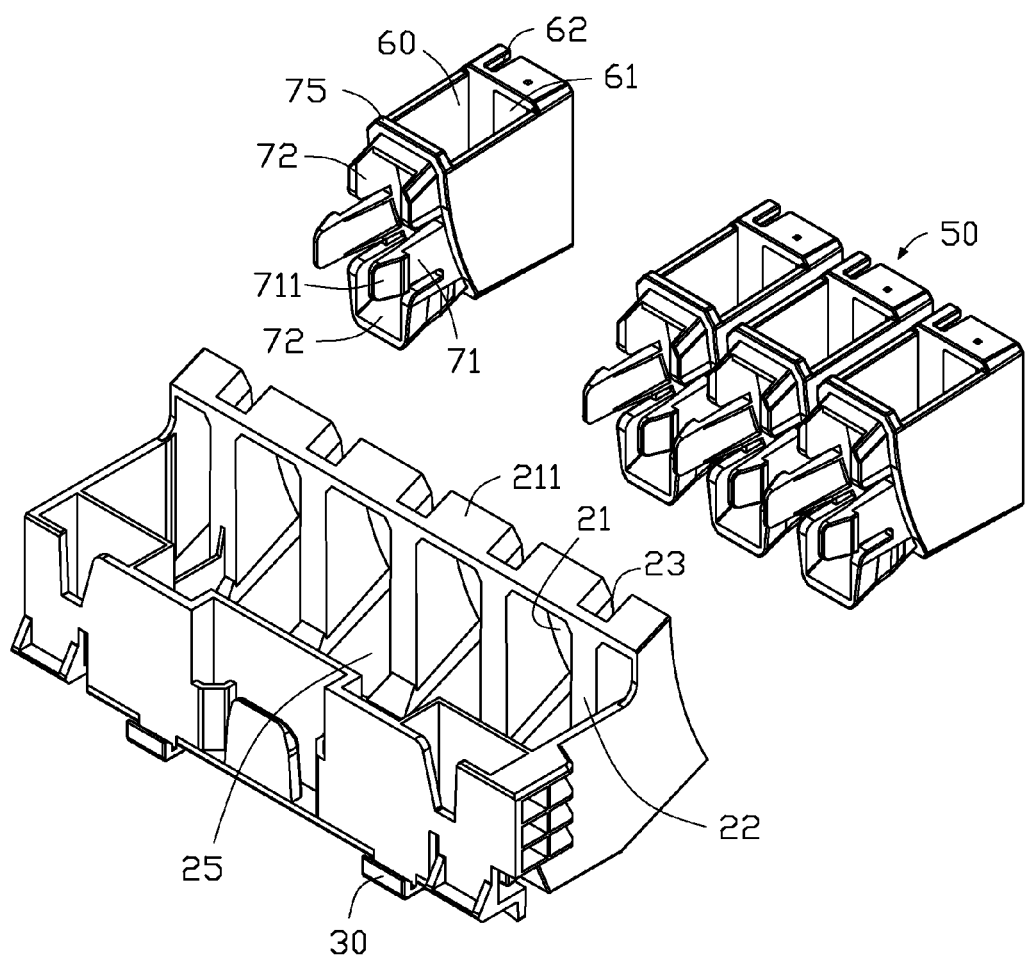
FIG. 2 is an isometric, exploded view of the expansion card securing mechanism of FIG. 1, but viewed from another angle.

FIGS. 1 and 2 illustrate the base 10 includes a latch portion 20 and a plurality of hooks 30. The latch portion 20 defines a plurality of latch holes 21. A plurality of securing members 50 can be inserted into the latch holes 21. Two adjacent latch holes 21 are connected by a latch plate 22. Four positioning plates 211 which are connected one by one are located around the latch hole 21. The positioning plates 211 are configured to secure the securing member 50. A slot 23 is defined between the two adjacent positioning plates 211 to receive an expansion card 80. The base 10 further defines a receiving space 25 which communicates with the latch holes 21. The hooks 30 can be secured in the chassis 90 to secure the expansion card securing mechanism 100 in the chassis 90.

The securing member 50 includes a hollow cavity 60 and a limiting portion 70 which is connected with the cavity 60. One end away from the limiting portion 70 of the cavity 60 defines a through hole 61. The expansion card can pass through the through hole 61 to be inserted into the cavity 60. The securing member 50 defines a receiving groove 62 near the though hole 61. The receiving groove 62 can receive different expansion cards. The limiting portion 70 includes two parallel limiting plates 71. One end of limiting plate 71 includes a protrusive block 711. The limiting portion 70 includes two limiting pieces 72. The limiting piece 72 can be inserted into the latch hole 21 to secure the securing member 50. There is a stopping plate 75 secured around the limiting portion 70. The stopping plate 75 can resist against the positioning plate 211 to secure the securing member 50.

Figure 5:
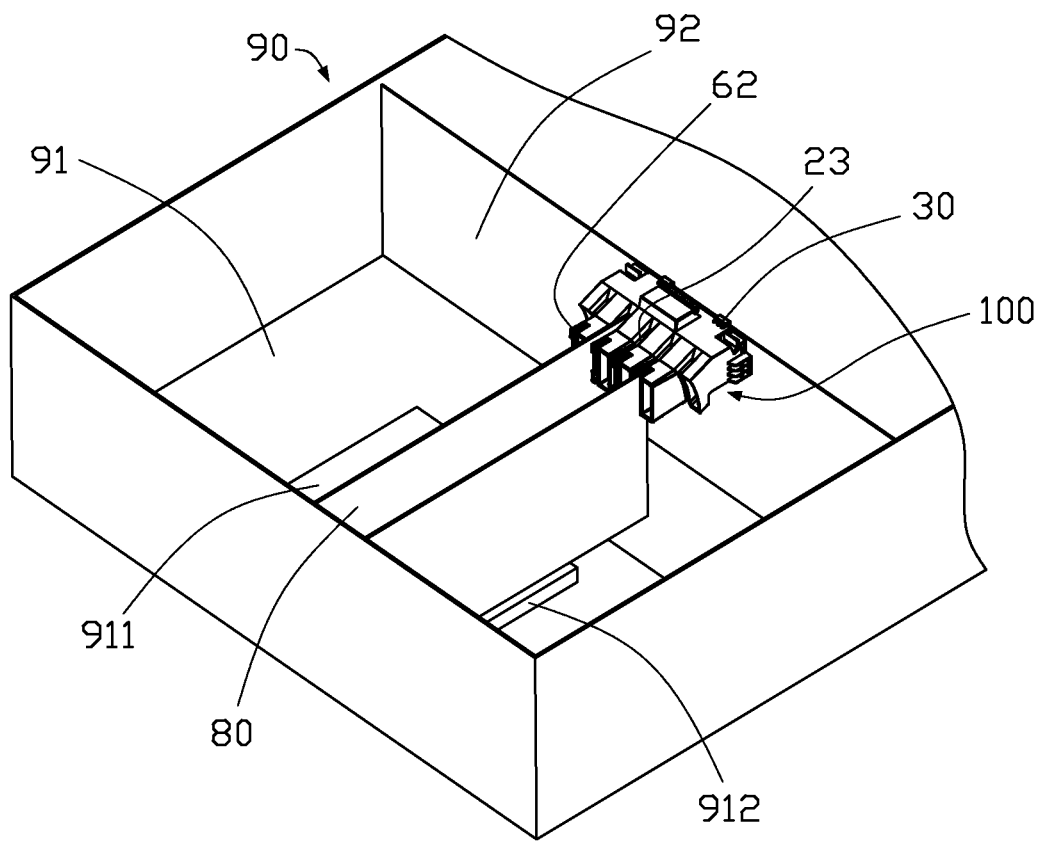
FIG. 5 is an isometric, assembled view of the expansion card securing mechanism, an expansion card and a chassis.

FIG. 5 illustrates the chassis 90 includes a bottom plate 91 and a side plate 92. A board 911 is located on the bottom plate 91. The board 911 is equipped with a plurality of card slots 912. The expansion cards 80 can be inserted into the card slots 912. The hooks 30 of the base 10 can be secured on the side plate 92.

Figure 3:
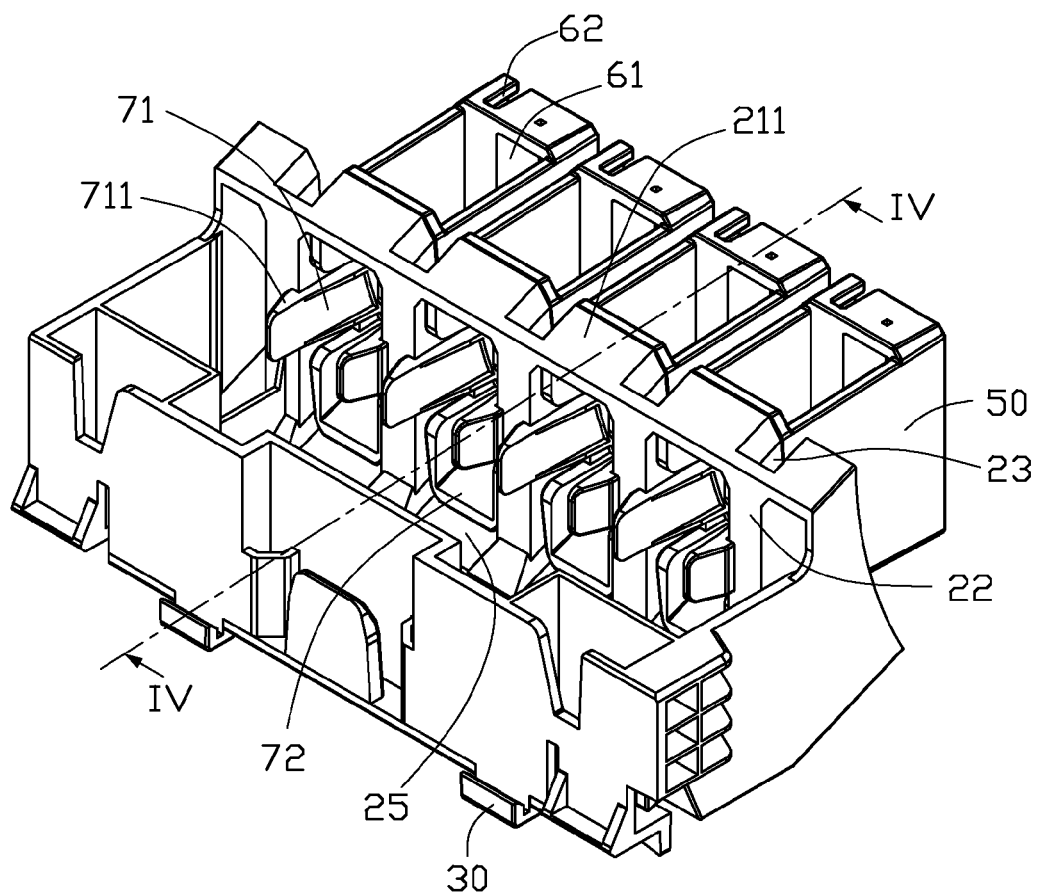
FIG. 3 is an isometric, assembled view of the expansion card securing mechanism of FIG. 1.
Figure 4:
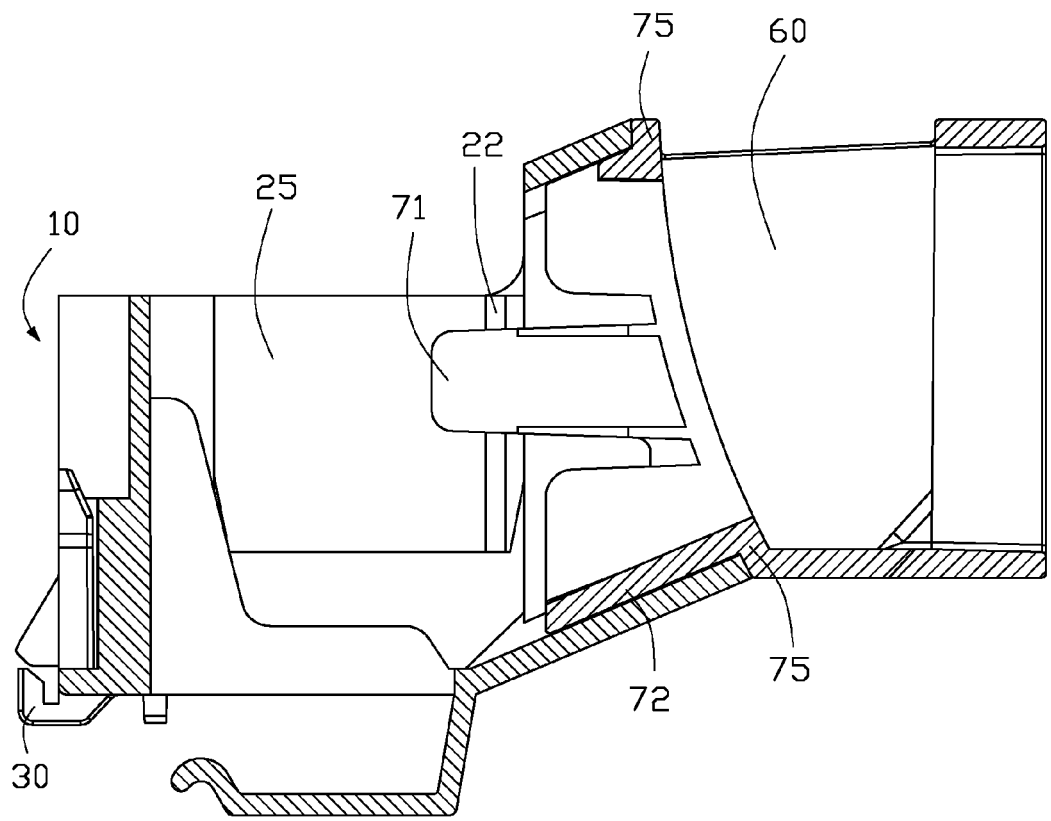
FIG. 4 is a cross sectional view of the expansion card securing mechanism along a line IV-IV of FIG. 3.

FIGS. 3 to 5 illustrate when in assembly, the limiting portion 70 of the securing member 50 is inserted into the latch hole 21. The limiting plate 71 is elastically bent to be inserted into the latch hole 21. When the two limiting pieces 72 resist against the positioning plate 211 of the latch portion 20, the limiting plate 71 passes through the latch hole 21 and is received in the receiving space 25. The limiting plate 71 is elastically recovered to secure the protrusive block 711 on the latch plate 22. Then, the securing member 50 is installed on the base 10. The expansion card securing mechanism 100 is completely assembled.

The expansion cards 80 are inserted into the card slots 912. The expansion card securing mechanism 100 is placed on the expansion cards 80. One end of the expansion cards 80 is inserted into the slots 23, the cavity 60 or the receiving grooves 62. The hooks 30 of the expansion card securing mechanism 100 are secured on the side plate 92. Then, the expansion card securing mechanism 100 is secured to the expansion cards 80 in the chassis 90.

It is to be understood, however, that even though numerous characteristics and advantages of the embodiments have been set forth in the foregoing description, together with details of the structure and functions of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. An expansion card securing mechanism comprising:
a base comprising a latch portion defining a plurality of latch holes; and
a plurality of securing members secured on the base, each securing member defining a cavity and is configured to be secured in a respective one of the plurality of latch holes;
wherein the respective latch hole and the cavity can receive and secure different kinds of the expansion cards; the adjacent latch holes are connected by a latch plate, the securing member can be secured on the latch plate.

2. The expansion card securing mechanism of claim 1, wherein the base defines a receiving space which is connected with the latch hole, the securing member can be received in the receiving space.

3. The expansion card securing mechanism of claim 1, wherein the one end near the cavity of the securing member comprises two limiting plate, the limiting plate can be elastically deformed to secure on the latch plate and to secure the securing member in the base.

4. The expansion card securing mechanism of claim 3, wherein one end of the limiting plate comprises a limiting block, the limiting plate can be elastically deformed to secure the limiting block on the latch plate and to secure the securing member in the base.

5. The expansion card securing mechanism of claim 3, wherein one end away from the limiting plate of the cavity defines a through hole, the expansion card can pass through the through to be received in the cavity.

6. The expansion card securing mechanism of claim 3, wherein a plurality of limiting pieces are set around the limiting plate, the limiting piece can be inserted into the latch hole to secure the securing member.

7. The expansion card securing mechanism of claim 6, wherein the securing member near the limiting plate and the limiting piece is equipped with a stopping plate, the stopping plate can be resisted against the positioning plate to secure the securing member.

8. The expansion card securing mechanism of claim 1, wherein four positioning plates are set around the latch hole, the adjacent positioning plates of two latch holes define a slot, the expansion card can be received in the slot.

9. The expansion card securing mechanism of claim 1, wherein the base further comprises a hook, the hook can be secured on a chassis to secure the expansion card securing mechanism on the chassis.

10. An expansion card combination, comprising:
a plurality of expansion cards;
a base comprising a latch portion, the latch portion defining a plurality of latch holes; and
a plurality of securing members secured on the base, each securing member defining a cavity;
wherein the securing member can be secured in the latch hole, the latch hole and the cavity can receive different kinds of the expansion cards to secure the expansion cards; four positioning plates are set around the latch hole, the adjacent positioning plates of two latch holes define a slot, the expansion card can be received in the slot.

11. The expansion card combination of claim 10, wherein the base defines a receiving space which is connected with the latch hole, the securing member can be received in the receiving space.

12. The expansion card combination of claim 10, wherein the adjacent latch holes are connected by a latch plate, the securing member can be secured on the latch plate.

13. The expansion card combination of claim 12, wherein the one end near the cavity of the securing member comprises two limiting plate, the limiting plate can be elastically deformed to secure on the latch plate and to secure the securing member in the base.

14. The expansion card combination of claim 13, wherein one end of the limiting plate comprises a limiting block, the limiting plate can be elastically deformed to secure the limiting block on the latch plate and to secure the securing member in the base.

15. The expansion card combination of claim 13, wherein one end away from the limiting plate of the cavity defines a through hole, the expansion card can pass through the through to be received in the cavity.

16. The expansion card combination of claim 13, wherein a plurality of limiting pieces are set around the limiting plate, the limiting piece can be inserted into the latch hole to secure the securing member.

17. The expansion card combination of claim 16, wherein the securing member near the limiting plate and the limiting piece is equipped with a stopping plate, the stopping plate can be resisted against the positioning plate to secure the securing member.

18. The expansion card combination of claim 10, wherein the base further comprises a hook, the hook can be secured on a chassis to secure the expansion card securing mechanism on the chassis.

* * * * *